(12) United States Patent
Nakajima et al.

(10) Patent No.: US 6,819,006 B2
(45) Date of Patent: Nov. 16, 2004

(54) VEHICLE CONTROL SYSTEM AND VEHICLE CONTROL METHOD

(75) Inventors: Yuki Nakajima, Yokohama (JP); Takahiro Yoshino, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 139 days.

(21) Appl. No.: 10/073,879

(22) Filed: Feb. 14, 2002

(65) Prior Publication Data

US 2002/0130519 A1 Sep. 19, 2002

(30) Foreign Application Priority Data

Mar. 15, 2001 (JP) ........................................ 2001-073635

(51) Int. Cl.$^7$ ................................................ F02N 11/06
(52) U.S. Cl. .................. 290/40 C; 290/40 B; 290/40 C
(58) Field of Search ............................ 290/40 C, 40 B, 290/40 A; 322/28, 125, 127

(56) References Cited

U.S. PATENT DOCUMENTS

| | | | | |
|---|---|---|---|---|
| 5,621,304 A | * | 4/1997 | Kiuchi et al. ................. | 322/18 |
| 5,847,520 A | | 12/1998 | Theurillat et al. .......... | 318/159 |
| 5,865,263 A | * | 2/1999 | Yamaguchi et al. ....... | 180/65.2 |
| 5,898,282 A | | 4/1999 | Drozdz et al. .............. | 318/139 |
| 6,208,034 B1 | * | 3/2001 | Yamaguchi ............... | 290/40 C |
| 6,215,198 B1 | * | 4/2001 | Inada et al. ................ | 290/40 C |
| 6,442,455 B1 | * | 8/2002 | Kotre et al. ................. | 701/22 |
| 6,490,511 B1 | * | 12/2002 | Raftari et al. ............... | 701/22 |
| 6,507,127 B1 | * | 1/2003 | Amano et al. ............ | 290/40 C |
| 6,555,927 B1 | * | 4/2003 | Suzuki et al. ............... | 290/34 |
| 6,573,675 B2 | * | 6/2003 | Schmitz et al. ............. | 318/434 |

FOREIGN PATENT DOCUMENTS

| | | |
|---|---|---|
| EP | 0 543 390 A1 | 5/1993 |
| EP | 0 645 278 A1 | 3/1995 |
| EP | 0 7189 50 A2 | 6/1996 |
| EP | 0 782 941 A1 | 7/1997 |
| EP | 0 943 475 A2 | 9/1999 |
| EP | 1 010 569 A1 | 6/2000 |
| JP | 8-47109 | 2/1996 |
| JP | 11-146503 | 5/1999 |

* cited by examiner

*Primary Examiner*—Dang Le
*Assistant Examiner*—Leda Pham
(74) *Attorney, Agent, or Firm*—Foley & Lardner LLP

(57) ABSTRACT

A vehicle control system includes a generating device (1,4), a motor (5) electrically connected to this generating device (1,4) and a battery (27), and a controller (11, 12, 13). This controller (11, 12, 13) computes a target motor power based on a vehicle running condition, computes an available battery output which can be supplied from the battery (27) to the motor (5) based on this target motor power, computes a target generated power of the generating device (1,4) based on the available battery output and target motor power, and controls the generating device (1,4) based on the target generated power.

9 Claims, 4 Drawing Sheets

(Tmpb = 25 °C)

(Tmpb = 0 °C)

(Tmpb = -10 °C)

VEHICLE CONTROL SYSTEM AND VEHICLE CONTROL METHOD

FIELD OF THE INVENTION

This invention relates to a vehicle control, and in particular relates to the control of a vehicle provided with a generator and a vehicle drive motor.

BACKGROUND OF THE INVENTION

In recent years, hybrid vehicles (HEV) comprising an engine, motor and generator have been commercialized. HEV can be broadly classified into series HEV and parallel HEV. In both cases, all or part of the power of the engine is converted to electrical energy by the generator. Part of this electrical energy is supplied directly to the motor, and the excess electrical energy is stored in a battery. Electrical energy is supplied to the motor not only from the generator but also from this battery. The supplied electrical energy is converted to kinetic energy by the motor, and drives the vehicle.

When the energy produced by the engine passes through the generator, battery and motor, losses occur, and these losses are not necessarily small. Consequently, the parallel HEV wherein a mechanism is provided to drive the vehicle directly under the engine output and suppress these losses, has become the most popular form of hybrid vehicle.

However, if the energy consumed by the motor could be directly supplied by the generator without insufficiency or excess, the losses occurring when the battery is charged or discharged would be largely reduced, and the efficiency of even a series HEV might be improved. In JP-A-H11-146503 published by the Japanese Patent Office in 1999, a control method (referred to hereafter as synchronous power generation control) wherein the power consumed by the motor is generated by the generator without insufficiency or excess, in order to reduce the losses when the battery is charged or discharged.

SUMMARY OF THE INVENTION

However, in an HEV which performs this type of synchronous power generation control, battery charging and discharging may be performed intentionally due to the following reason.

Reason 1: Even if it is attempted to perform synchronous power generation control, it is impossible to completely eliminate excesses or insufficiencies, so the battery state of charge (SOC) must be feedback-controlled to an optimum value.

Reason 2: The synchronous power generation control will not always give the optimum fuel cost-performance under all running conditions. It may occur that under specific running conditions, synchronous power generation control may be interrupted and the battery is used.

Therefore, the following problem occurs when battery charging/discharging is performed intentionally while performing synchronous power generation control. Specifically, if the power generated is made less than the power required by the motor, the deficiency must be made up by power from the battery. However, the power which can be extracted from the battery and output to the motor varies according to the voltage which is applied to the motor, and if the generated power is reduced without considering the power which can be output, the power which can actually be output (discharged) from the battery will be less than expected, and it may not be possible to supply the motor power required by the driver.

It is therefore an object of this invention to supply a motor power required by the driver without being affected by a battery charge state, when battery charging/discharging is performed intentionally while performing synchronous power generation control.

In order to achieve above object, this invention provides a control system for a vehicle, comprising a generating device, a battery, a motor electrically connected to the generating device and battery, which drives the vehicle, and a controller which functions to determine a running condition of the vehicle, compute a target motor power, which is a target value of the power of the motor, based on the vehicle running condition, compute an available output from the battery to the motor based on the target motor power, compute a target generated power, which is a target value of the power generated by the generating device, based on the available battery output and target motor power, and control the generating device based on the target generated power.

The details as well as other features and advantages of this invention are set forth in the remainder of the specification and are shown in the accompanying drawings.

BRIEF DESCRIPTION OF THE DRAWINGS

FIG. 4 is a map of the power which can be output by a battery.

DESCRIPTION OF THE PREFERRED EMBODIMENTS

Figure 1:
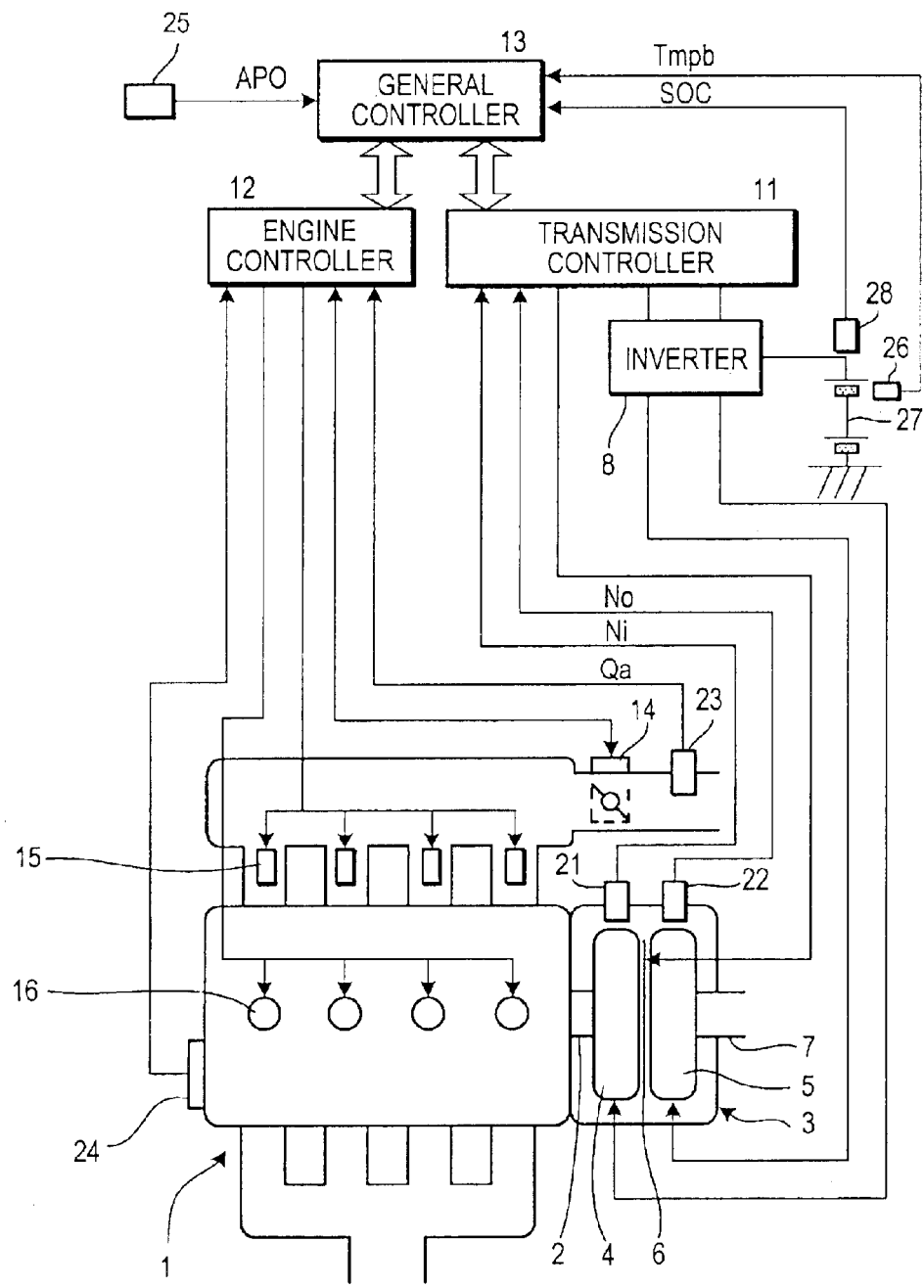
FIG. 1 is a schematic view of a vehicle control system according to this invention.

Referring to FIG. 1 of the drawings, the drive force of an engine 1 is transmitted to drive wheels, not shown, via a continuously variable transmission (CVT) 3. The CVT 3 comprises a motor-generator 4 and 5, the motor-generator 4 on the input side being connected to an output shaft 2 of the engine 1, and the motor-generator 5 on the output side being connected to a drive shaft 7. The motor-generator 4 mainly functions as a generator, and the motor-generator 5 mainly functions as a motor driven by the power generated by the motor-generator 3. Hereafter, the motor-generator 4 will be referred to as a generator, and the motor-generator 5 will be referred to as a motor.

The generator 4 and motor 5 comprise alternating current devices such as permanent magnet alternating current synchronous motors, and are connected respectively to an inverter 8. The rotation speeds of the generator 4 and motor 5 are controlled according to the drive frequency of the inverter 8. The ratio of drive frequencies of the inverter 8 is the speed ratio (ratio of output rotation speed to input rotation speed) of the CVT 3.

A generator rotation speed Ni from a generator rotation speed sensor (input shaft rotation speed sensor of the CVT 3) 21, and a motor rotation speed No from a motor rotation speed sensor (output shaft rotation speed sensor of the CVT 3) 22, are input to a transmission controller 11. The transmission controller 11 controls the drive frequency of the inverter 8 so that a target generator rotation speed tNi and target motor torque tTo computed by a general controller 13 are obtained.

A clutch 6 is interposed between the generator 4 and motor 5, and the input shaft of the generator 4 and output shaft of the motor 5 can be connected by engaging the clutch 6. The clutch 6 is controlled according to a command from an engine controller 12. For example, when the input shaft rotation speed and output shaft rotation speed of the CVT 3 are equal, the clutch 6 is engaged, and the drive force of the engine 1 is directly transmitted to the drive wheels so as to improve the fuel cost-performance of the vehicle by suppressing the losses in the generator 4 and motor 5.

The engine controller 12 controls an opening TVO of an electronic control throttle 14 so that the target engine torque tTe computed by the general controller 13 is obtained. An intake air amount according to the throttle opening flows into the engine 1. A flowrate Qa of the intake air is measured by an air flow meter 23 installed upstream of the electronic control throttle 14. In the engine controller 12, fuel injection control is performed by fuel injectors 15 and ignition timing control is performed by spark plugs 16 based on the air flow rate Qa and the engine rotation speed from a crank angle sensor 24.

An accelerator depression amount APO from an accelerator depression sensor 25 and a temperature Tmpb of the battery 27 from a temperature sensor 26 are input to the general controller 13. Based on these signals, the generator rotation speed Ni and motor rotation speed No obtained via the transmission controller 11, the general controller 13 computes the target motor torque tTo supplied to the motor 5 and target generator rotation speed tNi supplied to the generator 4 so that synchronous power generation takes place.

Synchronous power generation control has the following basic features.

(1) A target motor power tPo00 which is the target value of the power of the motor 5, is computed based on vehicle conditions (in this embodiment, the accelerator depression amount APO and vehicle speed VSP), (2) The motor 5 is controlled based on a target generated power tPg, (3) The target generated power tPg which is the target value of the power generated by the generator 4 is computed based on the target motor power tPo00, (4) The generator 4 is controlled based on this target generated power tPg.

Further, in this embodiment, (5) An available battery output Pblim is computed based on the target motor power tPo00, and (6) The target generated power tPg is computed taking account of the available battery output Pblim.

Figure 2:
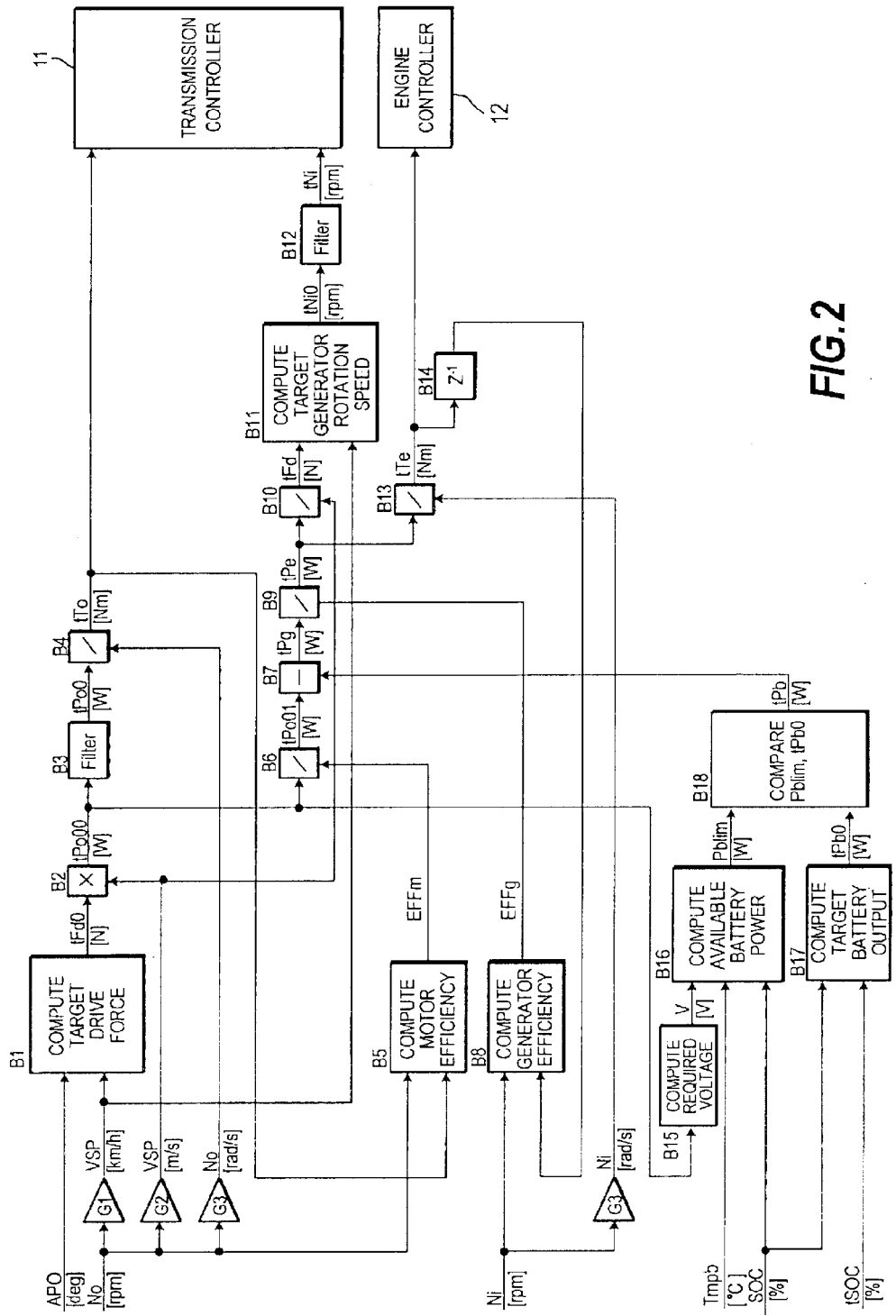
FIG. 2 is a control block diagram of a general controller.

The synchronous power generation control performed by the general controller 13 will now be described in detail referring to the control block diagram of FIG. 2.

In a block B1, a target drive force tFd0 [N] is computed based on the accelerator depression amount APO [deg] and vehicle speed VSP [km/h]. Specifically, the target drive force tFd0 is computed by looking up a target drive force map based on APO and VSP. The accelerator depression amount APO is detected by the accelerator depression sensor 25. The vehicle speed VSP is detected by multiplying the motor rotation speed No [rpm] detected by the motor rotation speed sensor 22, by a constant G1. If the radius of the drive wheels of the vehicle is r [m] and the gear ratio from the output shaft of the motor 5 to the drive shaft is R, the constant G1 is a value calculated by the following equation:

$$G1 = 2 \times \pi \times r \times 60/(R \times 1000)$$

In a block B2, a target motor power tPo00 [W] is computed by multiplying the target drive force tFd0 [N] by the vehicle speed VSP [m/s] so that the target drive force tFd0 is generated by the motor 5. The VSP used in the computation must be in units of [m/s], so the VSP in [m/s] units is computed by multiplying the motor rotation speed No [rpm] by a constant G2. The constant G2 is a value calculated by the following equation:

$$G2 = 2 \times \pi \times r/(R \times 60).$$

In a block B3, filter processing is performed on the target motor power tPo00 [W]. This filter processing is performed in order to lower the apparent control response speed of the motor 5.

In a block B4, the target motor torque tTo [Nm] is computed by dividing the target motor power tPo0 [W] after filter processing, by the motor rotation speed No [rad/s]. The units of the motor rotation speed No used here are [rad/s], so No in units of [rad/s] is computed by multiplying the motor rotation speed No [rpm] by a constant G3. The constant G3 is a value calculated by the following equation:

$$G3 = 2 \times \pi/60$$

The computed target motor torque tTo is sent to the transmission controller 11. The transmission controller 11 controls the torque of the motor 5 via the inverter 8 based on this target motor torque tTo.

In a block B5, an efficiency EFFm of the motor 5 is computed based on the aforesaid target motor torque tTo [Nm] and motor rotation speed No [rpm].

In a block B6, a motor consumption power tPo01 [W] is computed by dividing the target motor torque tPo00 [W] by this motor efficiency EFFm. In this embodiment, synchronous power generation control is performed and the power consumed by the motor 5 is basically generated by the generator 4 without excess or insufficiency, so the motor consumption power tPo01 during synchronous power generation is the basic value of the target generated power of the generator 4.

In a block B7, a value obtained by subtracting a battery output tPb [W] (described in detail later) from this motor consumption power tPo01 [W], is computed as the target generated power tPg [W]. The battery output tPb is a positive value when power is output from the battery 27 (discharge), and is a negative value when power is input to the battery 27 (charge).

In a block B8, an efficiency EFFg of the generator 4 is computed based on the generator rotation speed Ni [rpm] and the immediately preceding value of the target generator torque tNe [Nm] (supplied by a block B14 which outputs a value computed on the immediately preceding occasion). In a block B9, a generator consumption power tPe [W] is computed by dividing the target generated power tPg [W] by this generator efficiency EFFg. The generator 4 is driven by the engine 1, so the generator consumption power tPe represents the target engine power. As the engine 1 and generator 4 are directly connected, the generator rotation speed Ni is equal to the engine rotation speed.

In a block B10, a second target drive force tFd [N] is computed by dividing the target engine output tPe [W] by the vehicle speed VSP [m/s].

In a block B11, a target generator rotation speed tNi0 [rpm] is computed based on the second target drive force tFd [N] and vehicle speed VSP [km/h]. This computation is performed for example by looking up an output distribution map.

In a block B12, filter processing is performed on the target generator rotation speed tNi0 [rpm]. This filter processing is performed in order to lower the apparent control response speed of the generator 4, and is identical to the filter processing of the block B3.

The target generator rotation speed tNi [rpm] after filter processing is sent to the transmission controller 11. The transmission controller 11 controls the rotation speed of the generator 4 via the inverter 8 based on the target generator rotation speed tNi.

In a block B13, the target engine torque tTe [Nm] is computed by dividing the target engine power tPe [W] by the generator rotation speed Ni [rad/s]. The units of the generator rotation speed Ni used in this computation are [rad/s], so Ni in units of [rad/s] is computed by multiplying the generator rotation speed Ni [rpm] by the constant G3.

The target engine torque tTe is sent to the engine controller 12. In the engine controller 12, the engine torque is controlled based on the target engine torque tTe. Specifically, the opening of the electronic control throttle 14 is controlled to increase or decrease the intake air amount of the engine 1. In general, the actual engine torque follows the throttle opening control with a predetermined delay, so the filter processing of the block B3 or B12 is performed to synchronize the phase of the control of the motor 5 and generator 4 with this engine response delay.

Figure 3:
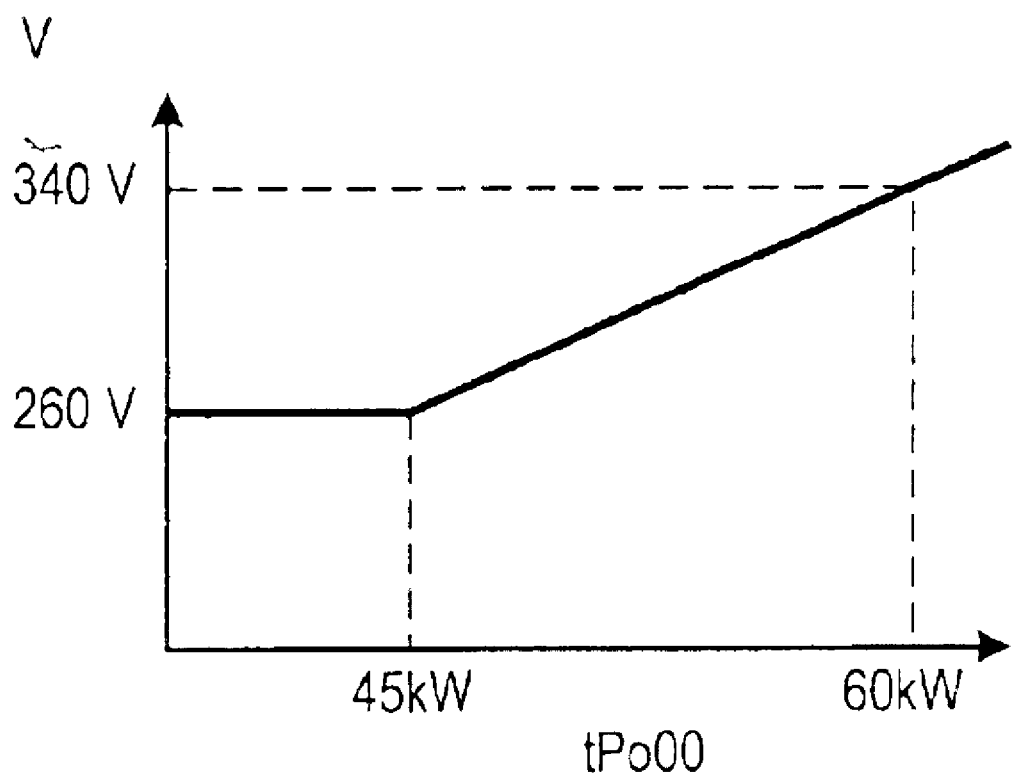
FIG. 3 is a required voltage table.

In the blocks B15, B16, the available battery output Pblim, which is the power which can be output from the battery 27 to the motor 5, is computed based on the target motor power tPo00. First, in the block B15, a required voltage V [V] which is applied to the motor 5 is computed based on the target motor power tPo00 [W]. The computation of this required voltage is performed by looking up a required voltage table shown in FIG. 3 based on the target motor power tPo00.

Figure 4A:
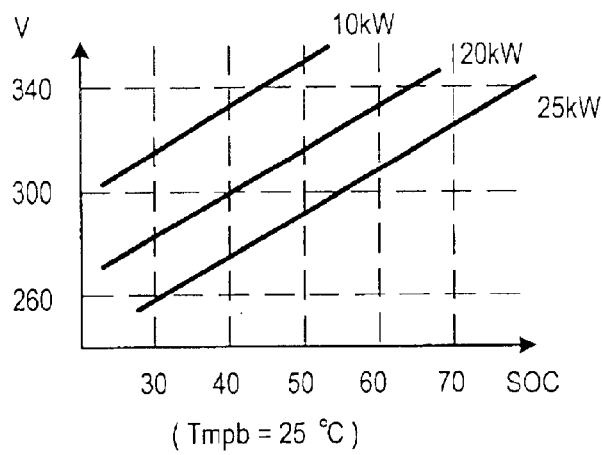
FIG. 4(a) shows characteristics when the battery temperature is 25° C.
Figure 4B:
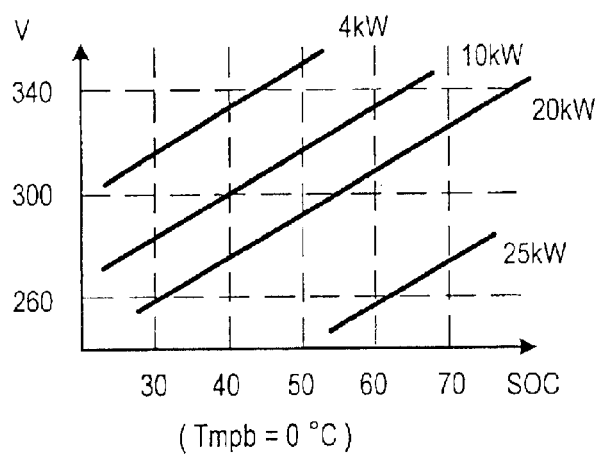
FIG. 4(b) shows characteristics when the battery temperature is 0° C.
Figure 4C:
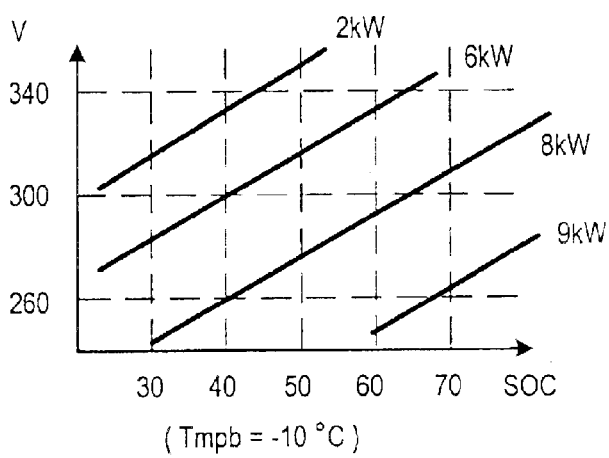
FIG. 4(c) shows characteristics when the battery to which is −10° C.

In the block B16, the available battery output Pblim [W] is computed based on the required voltage V [V], battery state of charge SOC [%] and battery temperature Tmpb [° C.]. This computation has three parameters, so two maps are first selected from FIGS. 4(a)–(c) according to the battery temperature Tmpb, and the look-up values of the selected maps are calculated based on the required voltage V and battery state of charge SOC. The available battery output Pblim is then calculated by linear interpolating between the values obtained by looking at these maps.

The reason why the available battery output Pblim is computed taking account not only of the required voltage V but also of the battery state of charge SOC and battery temperature Tmpb, is that the battery state of charge SOC or battery temperature Tmpb affects the available battery output Pblim. For example, in FIG. 4(a) which shows the state when the battery temperature Tmpb is 25° C., the value of the available battery output Pblim decreases the smaller the battery state of charge SOC becomes for the same required voltage V. The available battery output Pblim decreases the lower the battery temperature Tmpb becomes (FIG. 4(a) →FIG. 4(b)→FIG. 4(c)) for the same voltage V, and the same battery state of charge SOC. The battery state of charge SOC is detected by an SOC sensor 28. Specifically, the SOC sensor 28 detects the SOC based on the current flowing in and out of the battery 27 and the terminal voltage at that time. Tmpb is detected by a temperature sensor 26.

In block B17, a target battery output tPb0 [W] is computed to feedback control the battery state of charge SOC [%] to a target battery state of charge tSOC [%]. For example, if linear control is used as the feedback control, the target battery output tPb0 is computed by the following equation using a proportional gain Kp.

$$tPb0 = Kp \times (SOC - tSOC)$$

The target battery output tPb0 obtained from this equation is a positive value (discharge) when the actual SOC is higher than tSOC, and is a negative value (charge) when the actual SOC is lower than tSOC.

In a block B18, the target battery output tPb0 [W] and available battery output Pblim [W] are compared, and the smaller is selected as the battery output tPb [W].

Next, the operation of this embodiment will be described.

In this embodiment, the power consumed by the motor 5 is generated by the generator 4 without excess or insufficiency (synchronous power generation control). If the synchronous power generation control were ideal, the fluctuation in the battery state of charge SOC would be zero.

However, in practice, it is difficult to make the power consumption of the motor 5 coincide exactly with the power generated by the generator 4, so it may occur that the SOC gradually moves away from the optimum value (tSOC) as the vehicle continues running. Therefore, the SOC is feedback controlled (B17, B18).

For example, when the actual SOC is larger than the optimum value (target value), the power generated by the generator 4 is made less than the power consumed by the motor 5, and this difference of power is discharged from the battery 27 so that the SOC approaches the optimum value. Hence, although synchronous power generation control is basically performed, power may be extracted from the battery 27 in some cases.

The outputtable power by the battery 27 (available battery output), varies according to the voltage applied to the motor 5. For example, even if the SOC and temperature of the battery 27 are the same, when the voltage applied to the motor 5 is high (when the motor 5 generates high power), the available battery output is less than when the voltage applied to the motor 5 is low. Ignoring this fact, if the target generated power tPg were determined by subtracting the battery output determined to perform SOC feedback control from the motor power consumption tPo01, the power would be insufficient if the available battery output at that time was less than the battery output, and the motor power required by the driver would not be obtained.

To deal with this, in this embodiment, the available battery output Pblim is computed (predicted) by the blocks B15, B16, and a final battery output tPb is determined by limiting the target battery output tPb0 for SOC feedback control by the computed available battery output Pblim. Therefore, the battery output tPb is not set larger than the available battery output Pblim, the aforesaid power insufficiency is avoided, and the motor power required by the driver is always obtained.

In this embodiment, SOC feedback control was given as an example of intentional battery discharge control, but the invention is not limited to this case, and may be applied also when all the power of the battery 27 is used to run the vehicle.

Further, the case was described where the generating device comprised the engine 1 and generator 4, but the invention is not limited to this case, and may be applied also to a vehicle using another type of generating device (e.g., a fuel cell).

The entire contents of Japanese Patent Application P2001-73635 (filed Mar. 15, 2001) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A control system for a vehicle, comprising:

a generating device, a battery, a motor electrically connected to the generating device and the battery, which drives the vehicle, and a controller which functions to;

determine a running condition of the vehicle, compute a target motor power, which is a target value of the power of the motor, based on the vehicle running condition, compute an available battery output from the battery to the motor based on the target motor power, the available battery output being an outputtable power by the battery which varies according to a voltage applied to the motor, compute a target generated power, which is a target value of the power generated by the generating device, based on the available battery output and the target motor power, and control the generating device based on the target generated power.

2. The control system as defined in claim 1, wherein:

the generating device comprises an engine and a generator connected to the engine, and the controller further functions to control the rotation speed of the generator and torque of the engine based on the target generated power.

3. The control system as defined in claim 1, wherein the controller further functions to:

compute a voltage required to obtain the target motor power, and compute the available battery output based on the required voltage.

4. The control system as defined in claim 3, wherein the controller further functions to compute the available battery output such that the computed available battery output decreases as the required voltage increases.

5. The control system as defined in claim 4, further comprising:

a sensor which detects a state of charge of the battery, and the controller further functions to compute the available battery output such that the computed available battery output decreases as the state of charge of the battery decreases.

6. The control system as defined in claim 4, further comprising:

a sensor which detects a temperature of the battery, and the controller further functions to compute the available battery output such that the computed available battery output decreases as the battery temperature decreases.

7. The control system as defined in claim 1, wherein the controller further functions to:

compute a target battery output, which is a target value of the power output from the battery, to make the state of charge of the battery approach a target value, compute the target generated power by subtracting the target battery output from the target motor power when the target battery output is smaller than the available battery output, and compute the target generated power by subtracting the available battery output from the target motor power when the target battery output is larger than the available battery output.

8. A control system for a vehicle, comprising:

a generating device, a battery, a motor electrically connected to the generating device and the battery, which drives the vehicle, means for determining a running condition of the vehicle, means for computing a target motor power, which is a target value of the power of the motor, based on the vehicle running condition, means for computing an available battery output from the battery to the motor based on the target motor power, the available battery output being an outputtable power by the battery which varies according to a voltage applied to the motor, means for computing a target generated power, which is a target value of the power generated by the generating device, based on the available battery output and the target motor power, and means for controlling the generating device based on the target generated power.

9. A vehicle control method used for a vehicle including a generating device, a battery, and a motor electrically connected to the generating device and the battery, wherein the motor drives the vehicle, the method comprising:

determining a running condition of the vehicle, computing a target motor power, which is a target value of the power of the motor, based on the vehicle running condition, computing an available battery output from the battery to the motor based on the target motor power, the available battery output being an outputtable power by the battery which varies according to a voltage applied to the motor, computing a target generated power, which is a target value of the power generated by the generating device, based on the available battery output and the target motor power, and controlling the generating device based on the target generated power.

* * * * *